US008419298B2

(12) United States Patent
Kawamoto et al.

(10) Patent No.: US 8,419,298 B2
(45) Date of Patent: Apr. 16, 2013

(54) DRIVE MECHANISM, BLADE DRIVE MECHANISM AND OPTICAL DEVICE

(75) Inventors: Hisashi Kawamoto, Chiba (JP); Yutaka Asai, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 13/039,631

(22) Filed: Mar. 3, 2011

(65) Prior Publication Data

US 2011/0150458 A1     Jun. 23, 2011

Related U.S. Application Data

(63) Continuation of application No. PCT/JP2009/062627, filed on Jul. 10, 2009.

(30) Foreign Application Priority Data

Oct. 6, 2008   (JP) ................................ 2008-259673

(51) Int. Cl.
G03B 9/02   (2006.01)

(52) U.S. Cl.
USPC ........................................................ 396/508

(58) Field of Classification Search .................. 396/505, 396/508, 510
See application file for complete search history.

(56) References Cited

U.S. PATENT DOCUMENTS

| | | | | |
|---|---|---|---|---|
| 3,535,568 A | * | 10/1970 | Haverkamp | 310/77 |
| 4,797,700 A | * | 1/1989 | Tsuji et al. | 396/508 |
| 4,884,091 A | * | 11/1989 | Nakagomi | 396/508 |
| 2007/0159030 A1 | * | 7/2007 | Naganuma et al. | 310/49 R |
| 2007/0297791 A1 | | 12/2007 | Fukasawa | |

FOREIGN PATENT DOCUMENTS

| | | | |
|---|---|---|---|
| CN | 101000446 A | | 7/2007 |
| JP | 02294245 A | * | 12/1990 |
| JP | 2004-37176 A1 | | 2/2004 |
| JP | 2004-170730 A1 | | 6/2004 |
| JP | 2005-250297 A1 | | 9/2005 |
| JP | 2007-124826 A1 | | 5/2007 |
| JP | 2008-3437 A1 | | 1/2008 |
| JP | 2008-131688 | | 6/2008 |

OTHER PUBLICATIONS

Office Action dated Jan. 20, 2012 issued in corresponding Chinese Patent Application No, 200980139505,3 with English translation.
International Search Report for International Application No. PCT/JP2009/062627 dated Aug. 25, 2009.
Korean Office Action dated Apr. 16, 2012.
Chinese Office Action dated Sep. 28, 2012, in the corresponding Chinese patent application No. 200980139505.3 (w/translation).
Korean Office Action dated Oct. 31, 2012, in the corresponding Korean patent application No. 9-5-2012-06594957 (w/translation).
Japanese Office Action dated Jan. 8, 2013 with English translation.

* cited by examiner

*Primary Examiner* — Clayton E Laballe
*Assistant Examiner* — Dennis Hancock
(74) *Attorney, Agent, or Firm* — Kratz, Quintos & Hanson, LLP

(57) ABSTRACT

A drive mechanism includes: an actuator including a rotor magnetized; a magnetic body, a magnetically attractive force being generated between the magnetic body and the rotor; and a sandwiched member sandwiched between the rotor and the magnetic body. At least one of the magnetic body and the sandwiched member is coupled to the rotor, and the magnetic body and the sandwiched member slidably contact each other.

11 Claims, 8 Drawing Sheets

DRIVE MECHANISM, BLADE DRIVE MECHANISM AND OPTICAL DEVICE

CROSS-REFERENCE TO RELATED APPLICATION

This application is a continuation of and claims priority to International Patent Application No. PCT/JP2009/062627 filed on Jul. 10, 2009, which claims priority to Japanese Patent Application No. 2008-259673 filed on Oct. 6, 2008, subject matter of these patent documents is incorporated by reference herein in its entirety.

BACKGROUND (i) Technical Field

The present invention relates to drive mechanisms, blade drive mechanisms, and optical devices.

(ii) Related Art

There is known a technique of biasing a rotor employed in an actuator in an axial direction by means of a spring having a coil shape. This spring is arranged at the axial direction of the rotor (see Japanese Unexamined Patent Application Publication No. 2004-037176). The rotor is biased toward one side of the axial direction, thereby preventing rattling and the like.

The rotor is biased toward one side of the axial direction to slidably contact another member. It seems that this configuration prevents the hunting of the rotor. However, when such a spring is arranged in the axial direction of the rotor, the thickness of the mechanism is increased in the axial direction.

SUMMARY

It is therefore an object of the present invention to provide a drive mechanism, the thickness of which is reduced and the hunting is prevented, a blade drive mechanism, and an optical device.

According to an aspect of the present invention, there is provided a drive mechanism including: an actuator including a rotor magnetized; a magnetic body, a magnetically attractive force being generated between the magnetic body and the rotor; and a sandwiched member sandwiched between the rotor and the magnetic body, wherein at least one of the magnetic body and the sandwiched member is coupled to the rotor, and the magnetic body and the sandwiched member slidably contact each other.

DETAILED DESCRIPTION

In the following, the present invention will be described according to embodiments, with reference to the drawings.

Figure 1:
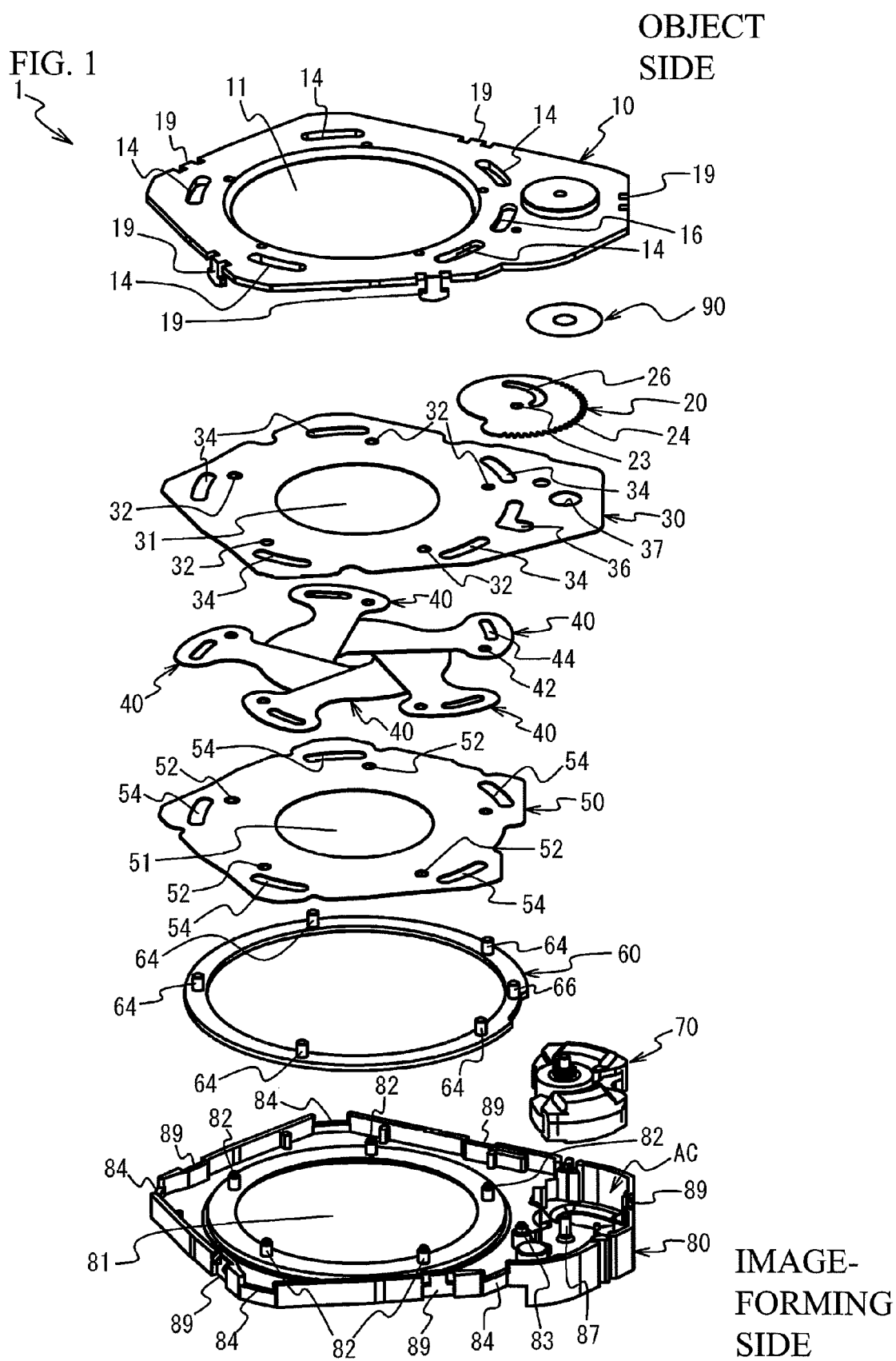
FIG. 1 is an exploded perspective view of a blade drive mechanism.

FIG. 1 is an exploded perspective view of a blade drive mechanism 1. The blade drive mechanism 1 includes a shutter board 10, a magnetic body 90, a decelerating member (transmitting member and sandwiched member) 20, a thin plate (sandwiched member) 30, five blades 40, a thin plate 50, a drive ring 60, an electromagnetic actuator 70, and a shutter board 80, which are arranged in this order from the object side to the image-forming side, when the object side is arranged on the upper side of the drawing and the image-forming side is arranged on the lower side of the drawing. When the blade drive mechanism according to the first embodiment of the present invention is employed in a camera (optical device), an image pickup element (not illustrated) for imaging an object image is arranged at an image-forming side.

Between the shutter boards 10 and 80 are housed the magnetic body 90, the decelerating member 20, the thin plate 30, the blades 40, the thin plate 50, the drive ring 60, and the electromagnetic actuator 70. The shutter board 10, the thin plates 30 and 50, and the shutter board 80 are respectively formed with openings 11, 31, 51, and 81, for defining the optical path, at their centers. Additionally, each of the openings 31 and 51 is smaller than each of the openings 11 and 81. The drive force of the electromagnetic actuator 70 is transmitted to the plural blades 40 via the decelerating member 20 and the drive ring 60. They will be described later in detail.

When the drive force is transmitted to the blades 40, the plural blades 40 swing about given positions. The apertures of the openings 11, 31, 51, and 81 are thus adjusted. The adjustment of the aperture enables the amount of object light to pass through the openings 11, 31, 51, and 81. That is, the blade drive mechanism according to the present embodiment serves as an aperture device for adjusting the amount of light. Further, the thin plates 30 and 50 are arranged to sandwich the blades 40, and serve for preventing the blades 40 from fluttering.

Figure 2:
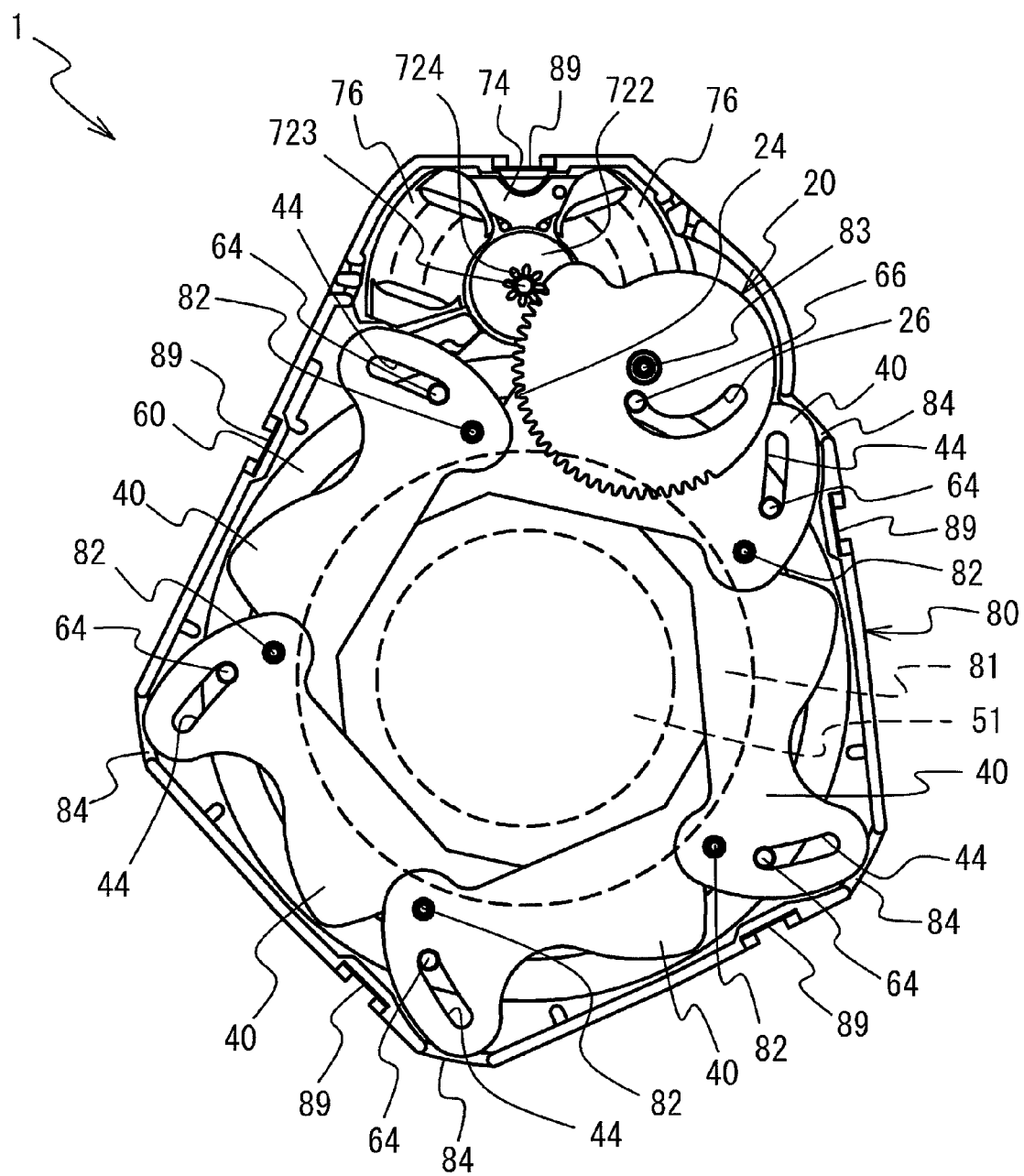
FIG. 2 is a front view of an internal structure of the blade drive mechanism which has been assembled.
Figure 3:
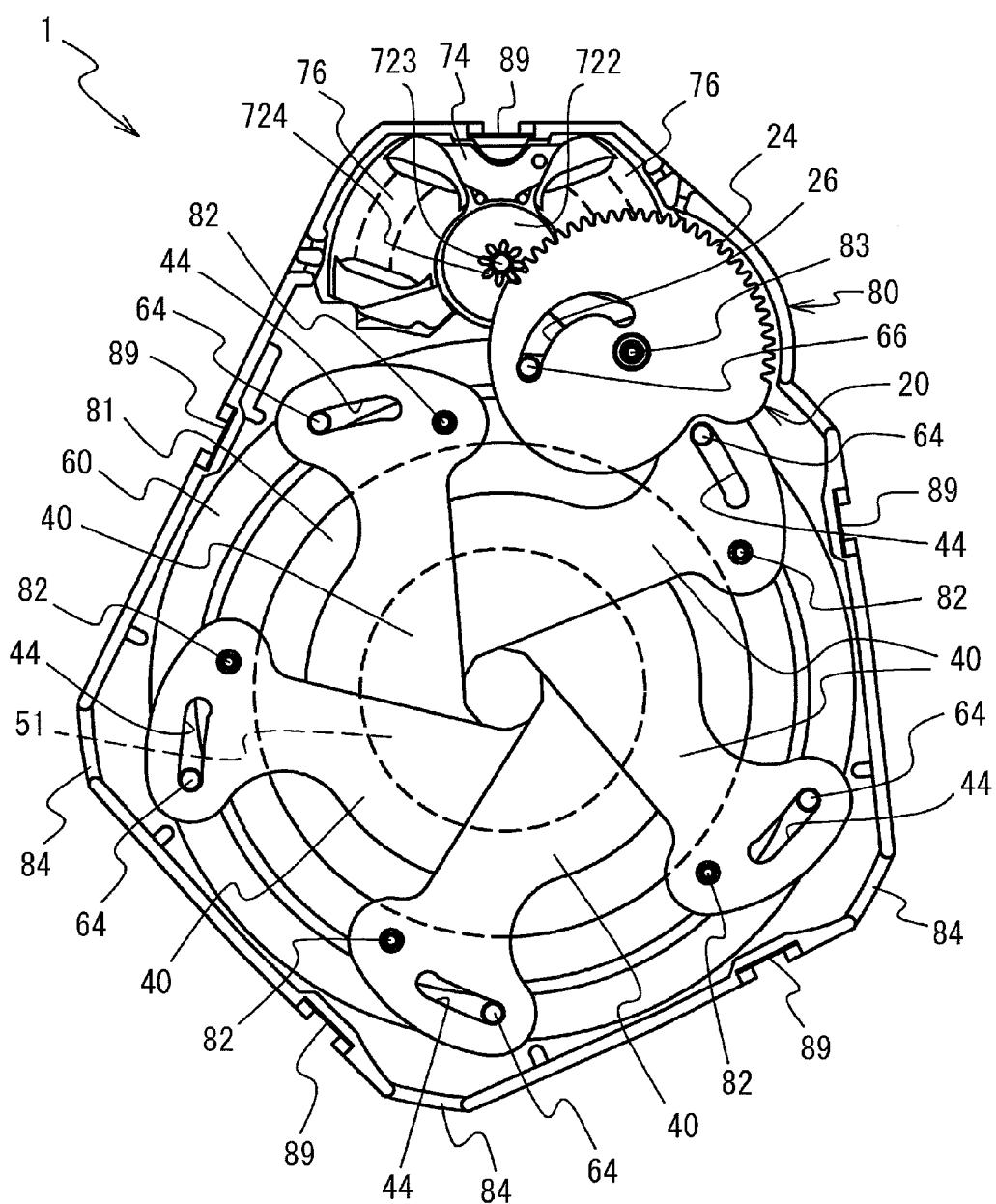
FIG. 3 is a front view of an internal structure of the blade drive mechanism which has been assembled.

FIGS. 2 and 3 are front views of an internal structure of the blade drive mechanism which has been assembled. In FIGS. 2 and 3, the shutter board 10, the thin plates 30 and 50, and the magnetic body 90 are omitted. However, the opening 51 of the thin plate 50 is indicated by a broken line. Additionally, FIG. 2 illustrates a fully opened state where the blades 40 recede from the opening 51. FIG. 3 illustrates a small aperture state where the blades 40 reach the opening 51.

The electromagnetic actuator 70 includes a rotor 72, a stator 74, coils 76 or the like, as illustrated in FIGS. 2 and 3.

The rotor 72 includes: a cylindrical portion 722 which is formed in a cylindrical shape and which is magnetized to have different magnetic polarities in its circumferential direction; and a rotary shaft portion 723 which is integrally formed with the cylindrical portion 722. The cylindrical portion 722 and the rotary shaft portion 723 are integrally formed by insert molding. The cylindrical portion 722 is made of a magnet resin. The rotary shaft portion 723 is made of a synthetic resin with good slidability. For example, the rotary shaft portion 723 is made of a polyacetal resin. Further, a support spindle 87 is provided to stand up in the shutter board 80. The rotary shaft portion 723 is slidably and rotatably supported by the support spindle 87. This supports the rotor 72 for rotation.

The blades 40 are swingably supported by the support spindles 82. The support spindles 82 are arranged at the inner side of the drive ring 60, as illustrated in FIGS. 2 and 3. Further, referring now to FIG. 2, plural cutouts 84 are formed at the periphery of the shutter board 80. The cutouts 84 are formed for avoiding the interference of the blades 40 in the fully opened state.

Referring to FIGS. 2 and 3, the stator 74 is laterally U-shaped when viewed from its front side, and has both arms around which the coils 76 are each wound. The coils 76 are connected to a flexible printed circuit board, not illustrated, for energization. The stator 74 is excited by the state where the coils 76 are energized. By the magnetically attractive force and repulsive force generated between the excited stator 74 and the rotor 72, the rotor 72 is rotated by a given amount.

Figure 4:
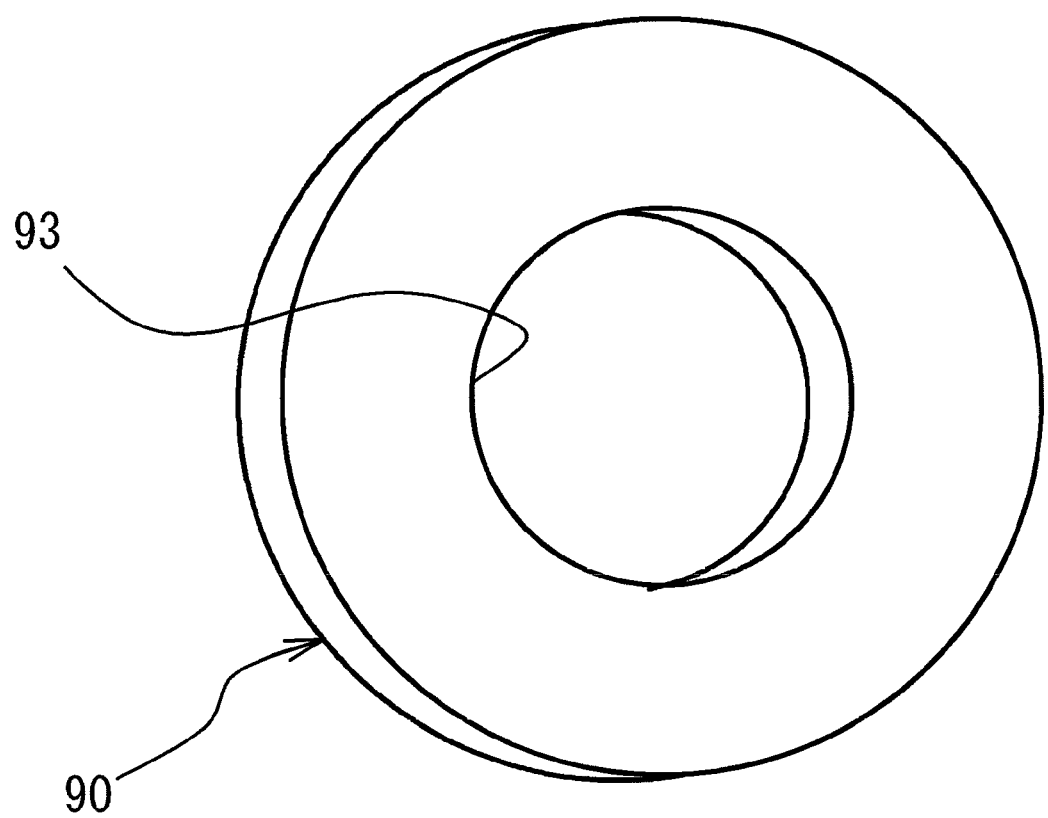
FIG. 4 is an enlarged view of a magnetic body.

Next, the magnetic body 90 will be described briefly. FIG. 4 is an enlarged view of the magnetic body 90. As illustrated in FIG. 4, the magnetic body 90 has a circular plate shape, and has a through hole 93 at its center. The material of the magnetic body 90 is a metal. Specifically, the material of the magnetic body 90 is a steel or a stainless steel. The magnetic body 90 is arranged in the axial direction of the rotor 72. The rotary shaft portion 723 penetrates through the through hole 93. Additionally, the diameter of the through hole 93 is larger than that of a teeth portion 724. That is, the teeth portion 724 is capable of rotating with penetrating the through hole 93. The magnetically attractive force is exerted between the magnetic body 90 and the rotor 72.

Figure 5:
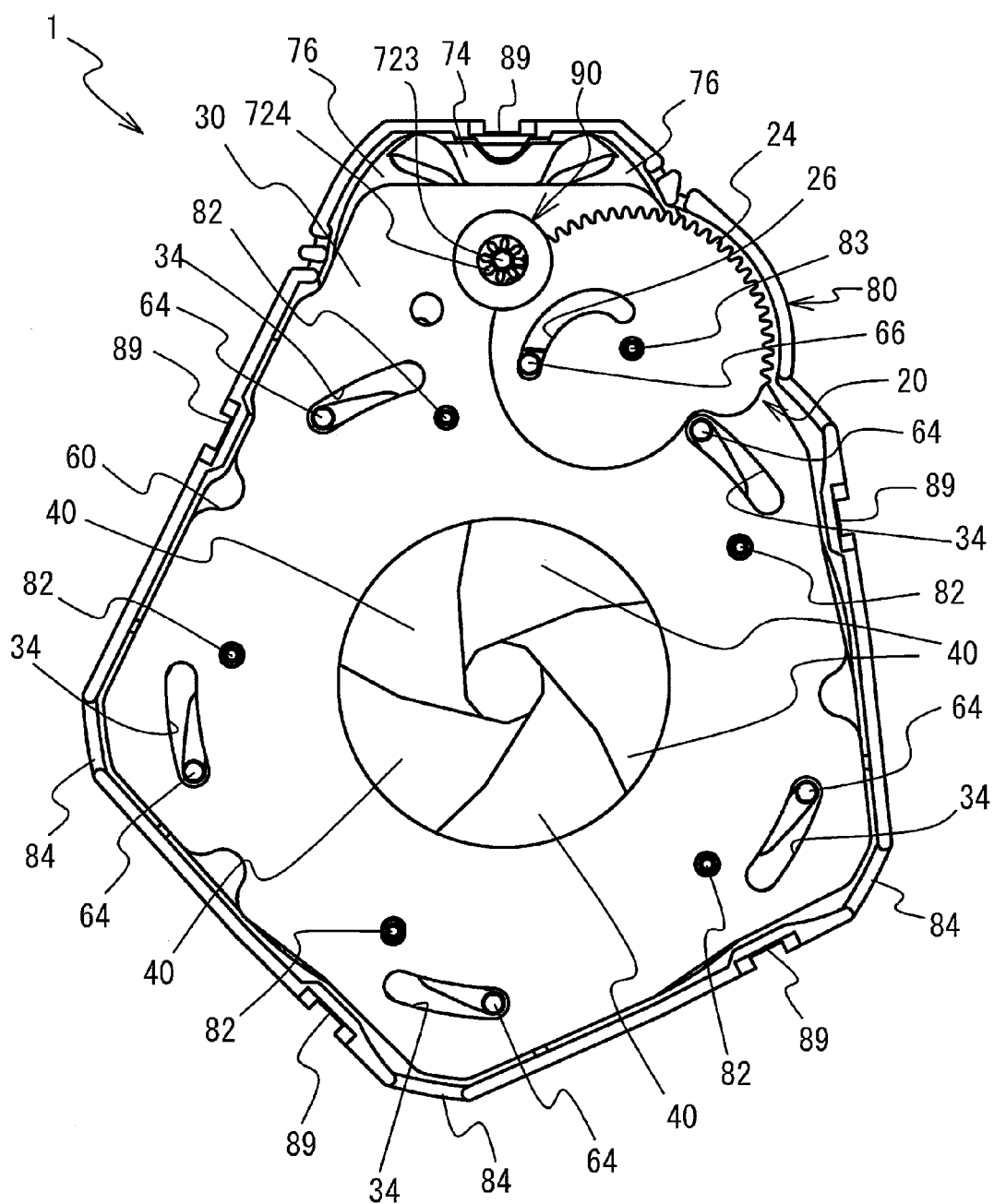
FIG. 5 is a front view of the blade drive mechanism and illustrates the state of the magnetic body.
Figure 6:
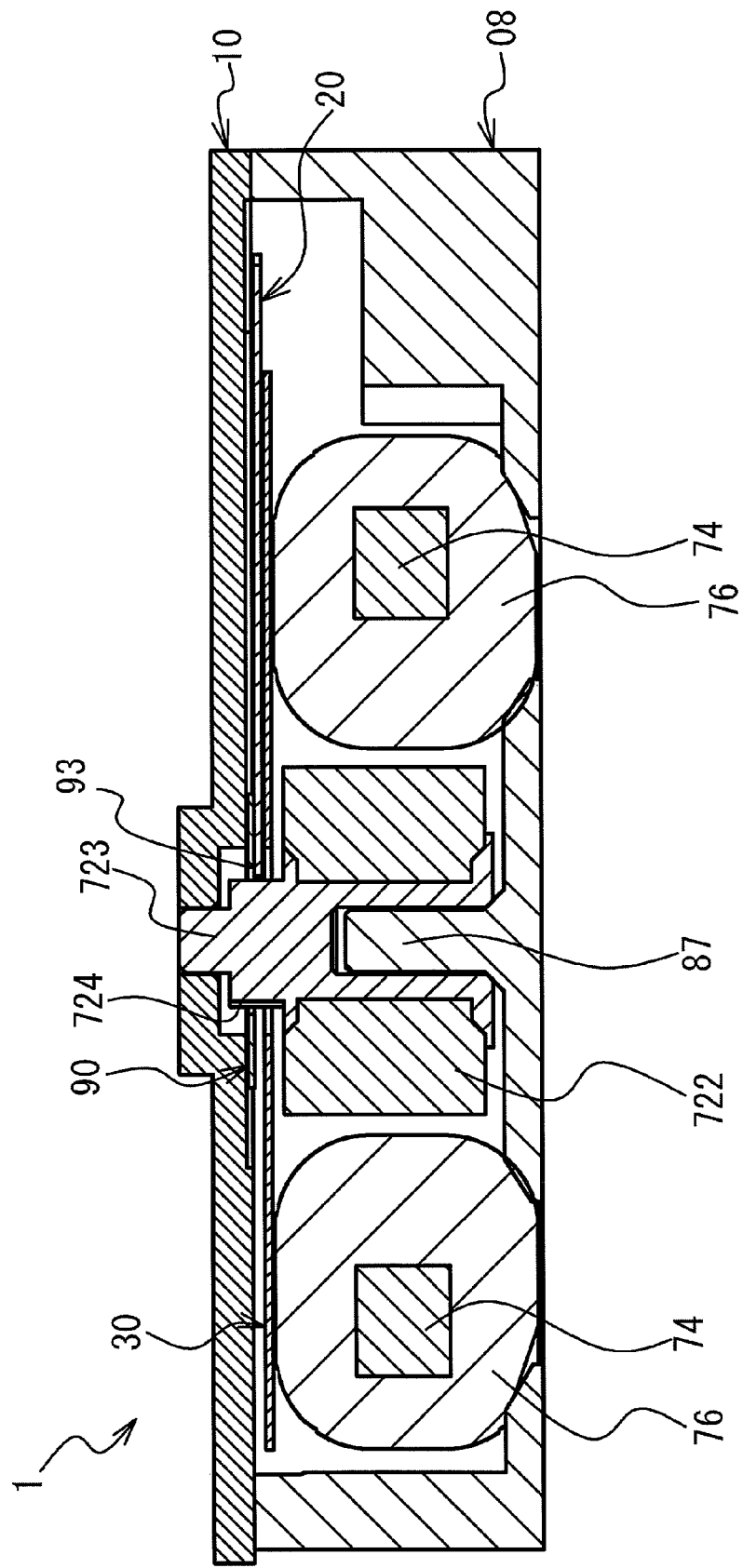
FIG. 6 is a cross-sectional view of the blade drive mechanism.

FIG. 5 is a front view of the blade drive mechanism and illustrates the state of the magnetic body 90. FIG. 6 is a cross-sectional view of the blade drive mechanism. As illustrated in FIGS. 5 and 6, the decelerating member 20 and the thin plate 30 are sandwiched between the magnetic body 90 and the rotor 72. The magnetic body 90 directly contacts the decelerating member 20. The decelerating member 20 and the thin plate 30 serve as the sandwiched members. The electromagnetic actuator 70, the magnetic body 90, the decelerating member 20, and the thin plate 30 serve as a drive mechanism. As illustrated in FIG. 6, the thin plate 30 does not contact the rotor 72.

Further, as illustrated in FIGS. 2, 3, 4, and 6, the rotary shaft portion 723 is integrally formed with the teeth portion 724 forming a rotor pinion portion. By the rotation of the rotor 72, the teeth portion 724 is rotated. Additionally, the thin plate 30 is formed with an escape hole 37 which permits the rotation of the rotary shaft portion 723, as illustrated in FIG. 1. The teeth portion 724 meshes a teeth portion 24 formed in the decelerating member 20. The decelerating member 20 is provided at its substantial center with a spindle hole 23. Referring now to FIGS. 1 to 3, by engaging a support spindle 83 of the shutter board 80 with the spindle hole 23, the decelerating member 20 is rotatably supported. Also, the decelerating member 20 includes a cam slot 26. The decelerating member 20 has a sheet shape thinner than a thickness of the teeth portion 724. Specifically, the thickness of the decelerating member 20 is set from about 0.03 mm to about 0.15 mm, preferably, from 0.05 mm to 0.10 mm.

Here, the material of the sheet shape may be any flexible or non-flexible one. For example, the material may be a polyacetal resin, a polyethylene terephthalate resin, or a metal, each of which is not flexible. In the present embodiment, the decelerating member 20 is made of a sheet-shaped member with flexibility. The teeth portion 24 is formed within a range of a substantially half of the periphery of the decelerating member 20. The cam slot 26 has a circular arc shape with its center different from that of the spindle hole 23.

The drive of the blades 40 will be described. When the teeth portion 724 rotates, the decelerating member 20 is rotated by the engagement of the teeth portion 724 with the teeth portion 24. The rotation of the decelerating member 20 enables a driven pin 66 engaging the cam slot 26 to rotate around the optical axis. The driven pin 66 is provided to stand up on the drive ring 60. When the decelerating member 20 rotates clockwise from the fully opened state illustrated in FIG. 2, the drive ring 60 rotates counterclockwise as illustrated in FIG. 3.

Also, the drive ring 60 is formed with drive pins 64. The drive pins 64 engage engagement slots 44 formed in the blades 40, each. Additionally, a spindle hole 42 is formed in the blade 40, as illustrated in FIG. 1, and engages the fixed spindle 82 formed in the shutter board 80. Accordingly, the blades 40 are supported for swinging about the fixed spindles 82, each.

In addition, referring now to FIG. 1, the shutter board 10, and the thin plates 30 and 50 are respectively formed with escape holes 14, 34, and 54, which are provided for permitting the movements of the drive pins 64. The shutter board 10 and the thin plate 30 are respectively formed with escape holes 16 and 36, which are provided for permitting the movement of the driven pin 66. The thin plates 30 and 50 are respectively formed with escape holes 32 and 52 into which the fixed spindles 82 are inserted. By the engagement of engagement pawls 19 provided in the shutter board 10 with the engagement portions 89 provided in the shutter board 80, the blade drive mechanism 1 is assembled.

When the drive ring 60 rotates counterclockwise from the fully opened state, the drive pins 64 move counterclockwise around the optical axis. In response thereto, the blades 40 swing about the support spindles 82 toward the center of the opening 51. In this way, the aperture of the opening 51 is adjusted. Also, by controlling the rotational position of the electromagnetic actuator 70, the aperture of the opening 51 is continuously adjustable.

In addition, each of the openings 31 and 51 is smaller than each of the openings 11 and 81. Further, the openings 31 and 51 have a substantially identical diameter. Thus, the amount of light is defined by the openings 31 and 51 in the fully opened state.

Next, the magnetic body 90 will be described in detail. Since the magnetically attractive force is exerted between the rotor 72 and the magnetic body 90, the magnetic body 90 is biased toward the rotor 72. Thus, the force is applied to the decelerating member 20 to be pushed toward the thin plate 30. Further, the decelerating member 20 is operatively coupled to the rotor 72. Therefore, the frictional resistance of the decelerating member 20 against the thin plate 30 is increased, and the decelerating member 20 slidably contacts the thin plate 30. Further, the magnetic body 90 slidably contacts the decelerating member 20, the frictional resistance of the decelerating member 20 against the magnetic body 90 is increased. Accordingly, the load is applied to the decelerating member 20. Therefore, the load is also applied to the rotation of the rotor 72, thereby preventing the hunting of the rotor 72. The hunting is prevented, thereby improving the accuracy for adjusting the amount of light and preventing the reexposure. The operation noise of the blade drive mechanism 1 is reduced.

Since the operation noise is reduced in this way, for example, when the blade drive mechanism according to the present embodiment is employed in a camera having a movie recording function, the possibility of recording the operational noise of the blade drive mechanism is avoidable during the time of movie recording.

The thickness of the blade drive mechanism 1 is reduced in the axial direction, as compared to a case where a spring having a coil shape is employed for preventing the hunting. Further, the magnetically attractive force is semipermanently unchanged. Therefore, there is almost no possibility of reducing the biasing force, when it is used for a long time, unlike the spring. Accordingly, the blade drive mechanism 1 prevents the hunting over a long term.

Moreover, by changing the material, the size, or the thickness of the magnetic body 90, the magnetically attractive force affected between the magnetic body 90 and the rotor 72 can be adjusted. This makes it possible to change the load on the rotor 72 easily.

Further, the rotary shaft portion 723 penetrates through the magnetic body 90 via the through hole 93, thereby ensuring the reduced thickness of the blade drive mechanism 1 in the axial direction.

Furthermore, the decelerating member 20 rotates slower than the rotation of the rotor 72. The magnetic body 90 applies the load to the decelerated 20 in this way. Therefore, the hunting of the rotor 72 can be effectively prevented, as compared to a case where the load is directly applied to the rotor 72 only.

Moreover, since the decelerating member 20 is partially pushed toward the rotor 72, for example, the decelerating member 20 is prevented from being rolled up in the assembling work. This improves the assembling workability. Further, unlike the spring, the magnetic body 90 is not expandable, thereby facilitating the assemble.

Additionally, in consideration of downsizing, it is preferable that the diameter of the magnetic body 90 should be equal to or smaller than 1.5 times of the diameter of the rotor 72. In consideration of facilitation of assembling, it is preferable that it should be equal to or greater than 0.5 times of the diameter of the rotor 72. Moreover, it is preferable that the thickness of the magnetic body 90 should be approximately 0.05 mm to 0.1 mm.

Figure 7A:
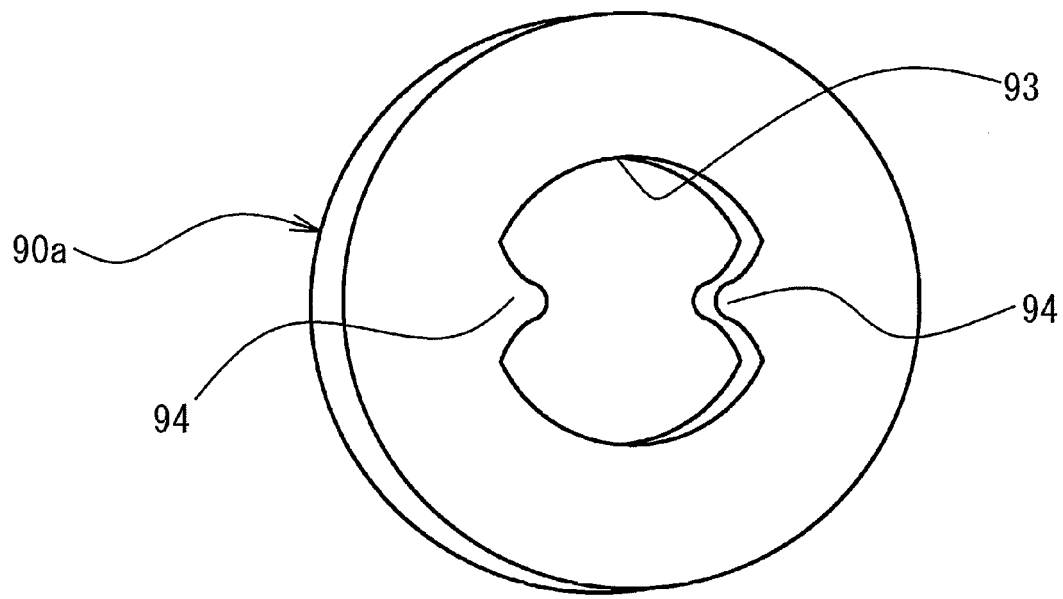
FIGS. 7A and 7B illustrate a variation of the magnetic body.
Figure 7B:
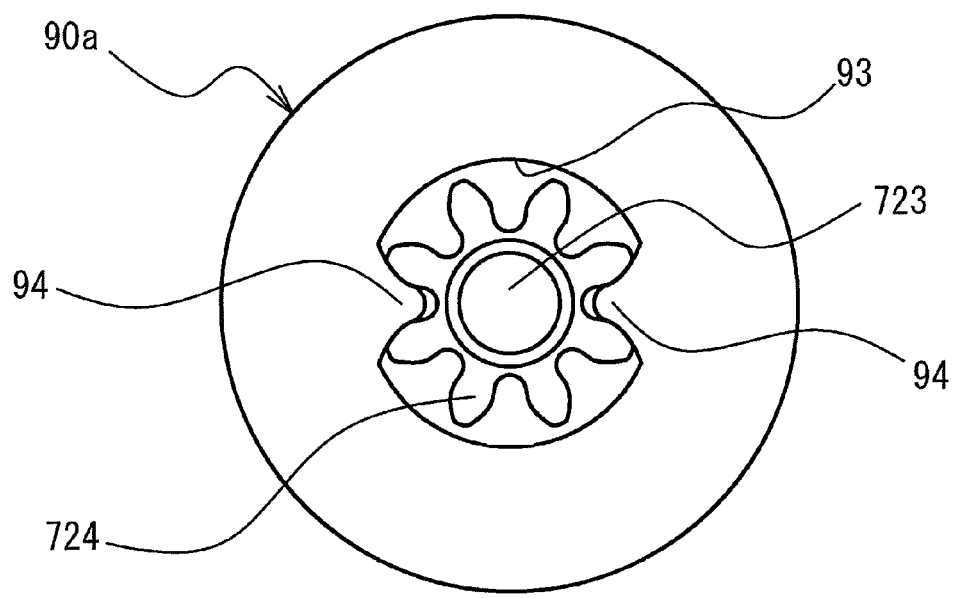

Next, a variation of the magnetic body will be described. FIGS. 7A and 7B illustrate the variation of the magnetic body. As illustrated in FIG. 7A, two projection portions 94 are provided in the vicinity of the through hole 93, and projects toward the center of the through hole 93. FIG. 7B illustrates a magnetic body 90a through which the rotary shaft portion 723 penetrates. The rotary shaft portion 723 is fitted with the magnetic body 90a with the rotary shaft portion 723 meshing the projection portions 94. Therefore, the magnetic body 90a co-rotates with the rotary shaft portion 723. That is, the magnetic body 90a rotates in conjunction with the rotary shaft portion 723. This prevents the end portion of the teeth portion 724 from being chipped due to the slidable contact between the teeth portion 724 and the inner peripheral surface of the through hole 93. Further, the magnetic body 90a is fitted with the rotary shaft portion 723 to be movable in the axial direction.

Figure 8:
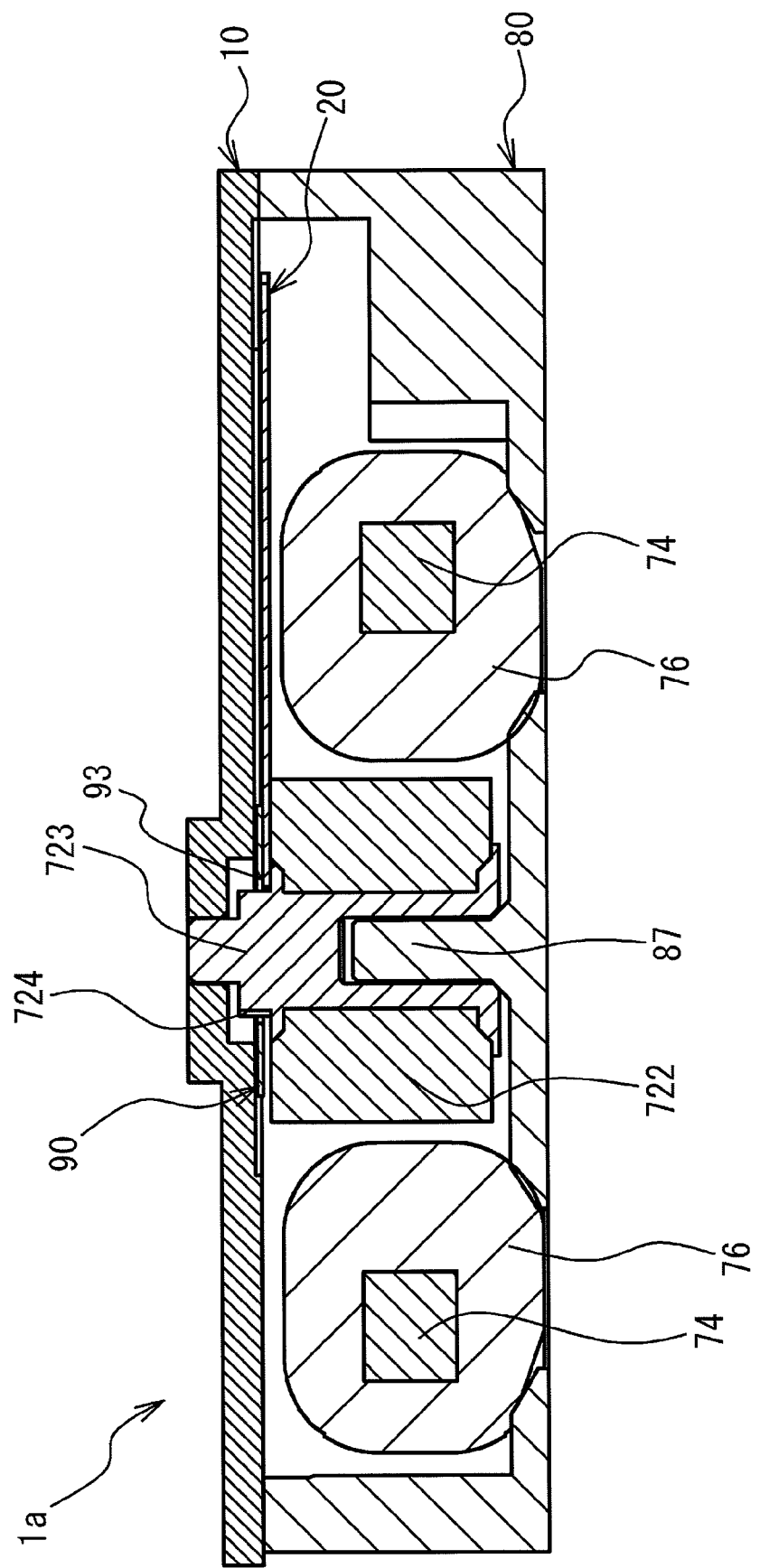
FIG. 8 is a cross-sectional view of a variation of the blade drive mechanism.

Next, a variation of the blade drive mechanism will be described. FIG. 8 is a cross-sectional view of the variation of the blade drive mechanism. As illustrated in FIG. 8, the blade drive mechanism 1a does not have the thin plate 30. Only the decelerating member 20 is sandwiched between the magnetic body 90 and the rotor 72. The decelerating member 20 slidably contacts both of the rotor 72 and the magnetic body 90. The decelerating member 20 is sandwiched between the rotor 72 and the magnetic body 90 to apply the pressure to the decelerating member 20 in the thrust direction, so that the frictional force between the rotor 72 and the decelerating member 20 is increased. For this reason, the load is applied to the rotor 72 in its rotational direction by the decelerating member 20, thereby preventing the rattling. Accordingly, the hunting of the rotor 72 is prevented. In addition, the magnetic body 90a, which moves in conjunction with the rotor 72, may be employed, instead of the magnetic body 90.

In the conventional bearing structure where the rotor 72 is directly biased toward one side of the axial direction by a coil spring or the like to prevent rattling, the sliding contact resistance between the rotor 72 and the support spindle 87 is increased, so that the wear of the rotor 72 or the support spindle 87 may be accelerated. In addition, in this case, a lubricant may be applied between the rotor 72 and the support spindle 87. However, if the lubricant is applied between the rotor 72 and the support spindle 87, the lubricant may spatter. In the present embodiment, the decelerating member 20 is sandwiched between the rotor 72 and the magnetic body 90, the load is applied to the decelerating member 20 and the rotor 72 in each rotational direction. This makes it possible to reduce the load in the axial direction of the rotor 72, and to greatly reduce the contact resistance between the rotor 72 and the support spindle 87. It is therefore possible to prevent wearing of the rotor 72 or the support spindle 87, and to eliminate the necessary to apply the lubricant.

While the exemplary embodiments of the present invention have been illustrated in detail, the present invention is not limited to the above-mentioned embodiments, and other embodiments, variations and modifications may be made without departing from the scope of the present invention.

For example, only the thin plate 30 may be arranged between the rotor 72 and the magnetic body 90a coupled to the rotor 72, and the rotor 72 may slidably contact the thin plate 30. Further, the thin plate 30 may slidably contact the magnetic body 90a. Furthermore, the thin plate 30 may slidably contact both of the rotor 72 and the magnetic body 90a.

Only the thin plate 30 may be arranged between the magnetic body 90 and the rotor 72, and the rotor 72 may slidably contact the thin plate 30.

The decelerating member 20 and the thin plate 30 may be arranged between the magnetic body 90 and the rotor 72, the thin plate 30 may be arranged at the magnetic body 90 side, the decelerating member 20 may be arranged at the rotor 72 side, and the rotor 72 may be arranged not to contact the decelerating member 20. In this case, the thin plate 30 is pushed toward the decelerating member 20 by the magnetically attractive force, and the thin plate 30 slidably contacts the decelerating member 20. This makes it possible to apply the resistance to the rotation of the rotor 72.

Further, only the decelerating member 20 may be arranged between the rotor 72 and the magnetic body 90a coupled to the rotor 72, and the decelerating member 20 may slidably contact the magnetic body 90a and the rotor 72. In this case, it is possible to apply a greater load to the rotation of the rotor 72.

The present embodiments exemplify the rotor 72 which includes the cylindrical portion 722 and the rotary shaft portion 723 that are integrally formed by insert molding. However, the rotor and the rotary shaft may be separated from each other, and then they are integrally formed by press fitting or the like. In addition, in the present embodiment, the rotary shaft portion 723 is integrally formed with the teeth portion 724. However, the present invention is not limited to such a configuration. For example, the rotary shaft may be press fitted into the pinion gear.

The present embodiments exemplify the blade drive mechanism and the lens drive mechanism serving as the drive mechanism which uses the reduction mechanism according to the present invention. However, the drive mechanism is not limited to them, and may employ, for example, a shutter drive mechanism, which adjusts the amount of light within an opening by driving a shutter blade or an ND filter to control the amount of object light entering an image pickup element.

Finally, several aspects of the present invention are summarized as follows.

According to an aspect of the present invention, there is provided a drive mechanism including: an actuator including a rotor magnetized; a magnetic body, a magnetically attractive force being generated between the magnetic body and the rotor; and a sandwiched member sandwiched between the rotor and the magnetic body, wherein at least one of the magnetic body and the sandwiched member is coupled to the rotor, and the magnetic body and the sandwiched member slidably contact each other.

By the magnetic attractive force, the force is effected on the magnetic body to be pushed toward the sandwiched member. Further, at least one of the magnetic body and the sandwiched member is coupled to the rotor, thereby increasing the frictional force between the magnetic body and the sandwiched member by the effect of the force in the axial direction. Therefore, the frictional resistance of the member coupled to the rotor against another member is increased to exert as a resistance to the movement of the member coupled to the rotor. This also applies the load to the rotation of the rotor. Thus, the hunting of the rotor is prevented.

According to another aspect of the present invention, there is provided a drive mechanism including: an actuator including a rotor magnetized; a magnetic body, a magnetically attractive force being generated between the magnetic body and the rotor; and a plurality of sandwiched members sandwiched between the rotor and the magnetic body, wherein at least one of the plurality of sandwiched members is coupled to the rotor, and the plurality of sandwiched members slidably contact each other.

Therefore, by the magnetic attractive force, the force is effected on the plural sandwiched members to be pushed toward each other. Further, at least one of the sandwiched members is coupled to the rotor, so the coupled member slidably contacts another member. This applies the load to the rotation of the rotor to prevent the hunting.

According to another aspect of the present invention, there is provided a drive mechanism including: an actuator including a rotor magnetized; a magnetic body, a magnetically attractive force being generated between the magnetic body and the rotor; and a sandwiched member sandwiched between the rotor and the magnetic body, wherein the rotor slidably contacts the sandwiched member.

By the magnetic attractive force, the force is effected on the sandwiched member to be pushed toward the rotor. Therefore, the load is directly applied to the rotation of the rotor. This prevents the hunting of the rotor.

According to another aspect of the present invention, there is provided a blade drive mechanism including: the above drive mechanism; a board including an opening; and a blade driven by a drive force of the rotor and adjusting an amount of light passing through the opening.

According to another aspect of the present invention, there is provided an optical device including the above blade drive mechanism.

What is claimed is:

1. A drive mechanism comprising:
   an actuator including a rotor magnetized, wherein the rotor includes a rotational shaft;
   a magnetic body that rotates about the rotational shaft, a magnetically attractive force being generated between the magnetic body and the rotor;
   and a sandwiched member sandwiched between the rotor and the magnetic body,
   wherein at least one of the magnetic body and the sandwiched member is coupled to the rotor, and the magnetic body and the sandwiched member slidably contact each other, whereby a frictional force is created;
   wherein the sandwiched member is coupled to the rotor and rotates slower than the rotor.

2. The drive mechanism of claim 1, wherein the sandwiched member slidably contacts the rotor.

3. The drive mechanism of claim 1, wherein the magnetic body includes a through hole through which the rotational shaft penetrates.

4. The drive mechanism of claim 3, wherein:
   the rotor includes a gear provided at one end of the rotational shaft;
   and the magnetic body is fitted with the gear to be movable in an axial direction of the rotor, and is coupled to the rotor.

5. A drive mechanism comprising:
   an actuator including a rotor magnetized, wherein the rotor includes a rotational shaft;
   a magnetic body that rotates about the rotational shaft, a magnetically attractive force being generated between the magnetic body and the rotor;
   and a plurality of sandwiched members sandwiched between the rotor and the magnetic body,
   wherein at least one of the plurality of sandwiched members is coupled to the rotor, and the plurality of sandwiched members slidably contact each other, whereby a frictional force is created.

6. A drive mechanism comprising:
   an actuator including a rotor magnetized, wherein the rotor includes a rotational shaft;
   a magnetic body that rotates about the rotational shaft, a magnetically attractive force being generated between the magnetic body and the rotor;
   and a sandwiched member sandwiched between the rotor and the magnetic body,
   wherein the rotor slidably contacts the sandwiched member, whereby a frictional force is created.

7. A blade drive mechanism comprising:
   a drive mechanism including: an actuator including a rotor magnetized, wherein the rotor includes a rotational shaft;
   a magnetic body that rotates about the rotational shaft, a magnetically attractive force being generated between the magnetic body and the rotor;
   and a sandwiched member sandwiched between the rotor and the magnetic body,
   wherein at least one of the magnetic body and the sandwiched member is coupled to the rotor, and the magnetic body and the sandwiched member slidably contact each other, whereby a frictional force is created;
   a board including an opening;
   and a blade driven by a drive force of the rotor and adjusting an amount of light passing through the opening;
   wherein the sandwiched member is coupled to the rotor and rotates slower than the rotor.

8. The blade drive mechanism of claim 7, wherein the sandwiched member is coupled to the rotor, and includes a transmitting member transmitting a drive force of the drive mechanism to the blade.

9. The blade drive mechanism of claim 8, wherein the transmitting member decelerates the drive force from the drive mechanism and transmits the drive force to the blade.

10. The blade drive mechanism of claim 8, wherein the transmitting member has a sheet shape.

11. An optical device comprising a blade drive mechanism, the blade drive mechanism including: a drive mechanism including: an actuator including a rotor magnetized, wherein the rotor includes a rotational shaft;
   a magnetic body that rotates about the rotational shaft, a magnetically attractive force being generated between the magnetic body and the rotor;
   and a sandwiched member sandwiched between the rotor and the magnetic body, wherein at least one of the magnetic body and the sandwiched member is coupled to the rotor, and the magnetic body and the sandwiched member slidably contact each other, whereby a frictional force is created;
a board including an opening;
and a blade driven by a drive force of the rotor and adjusting an amount of light passing through the opening;
wherein the sandwiched member is coupled to the rotor and rotates slower than the rotor.

* * * * *